(12) United States Patent
Cornelius et al.

(10) Patent No.: US 10,363,532 B2
(45) Date of Patent: Jul. 30, 2019

(54) MODULE FOR A COATING APPARATUS FOR GRANULAR BODIES

(71) Applicant: Robert Bosch GmbH, Stuttgart (DE)

(72) Inventors: Hans Dieter Cornelius, Dresden (DE); Ralf Kretzschmar, Dresden (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/958,583

(22) Filed: Apr. 20, 2018

(65) Prior Publication Data

US 2018/0311629 A1    Nov. 1, 2018

(30) Foreign Application Priority Data

Apr. 26, 2017    (DE) .................. 10 2017 206 976

(51) Int. Cl.
| | |
|---|---|
| *B01J 2/00* | (2006.01) |
| *A23G 3/26* | (2006.01) |
| *A23G 3/24* | (2006.01) |
| *A61J 3/00* | (2006.01) |
| *B01J 2/12* | (2006.01) |
| *A23G 3/34* | (2006.01) |
| *B05C 19/00* | (2006.01) |
| *B05C 19/06* | (2006.01) |
| *A23G 1/00* | (2006.01) |

(52) U.S. Cl.
CPC ............ *B01J 2/006* (2013.01); *A23G 1/0013* (2013.01); *A23G 1/0036* (2013.01); *A23G 1/0046* (2013.01); *A23G 1/0056* (2013.01); *A23G 3/0095* (2013.01); *A23G 3/26* (2013.01); *A61J 3/005* (2013.01); *B01J 2/12* (2013.01); *B05C 19/008* (2013.01); *B05C 19/06* (2013.01)

(58) Field of Classification Search
None
See application file for complete search history.

(56) References Cited

U.S. PATENT DOCUMENTS

| | | | | |
|---|---|---|---|---|
| 4,029,459 A | * | 6/1977 | Schmiedeke | B01J 2/20 366/83 |
| 2008/0193632 A1 | * | 8/2008 | O'Hara | A23G 3/0095 427/2.18 |
| 2012/0234239 A1 | * | 9/2012 | Hasegawa | A61J 3/005 118/712 |

FOREIGN PATENT DOCUMENTS

WO        2006108280        10/2006

* cited by examiner

*Primary Examiner* — Jethro M. Pence
(74) *Attorney, Agent, or Firm* — Michael Best & Friedrich LLP

(57) ABSTRACT

A coating apparatus having a rotatable drum with at least one moveable separating element arranged on an end side, and granular bodies can be transferred into the drum and/or out of the drum by a movement that leads to release. A separating element can be moved from a closed position into an open position by rotation about an axis of rotation. In the closed position, a subregion lies with its underside against an inner wall of the drum or has a small gap there. In the open position, the subregion on the underside is spaced apart from the inner wall of the drum and there is an opening there through which granular bodies can pass. On the end sides of the drum there are stop elements with which a drum of at least one further module is connectable in order to form a coating apparatus and/or a closure element.

11 Claims, 2 Drawing Sheets

Figure 2c
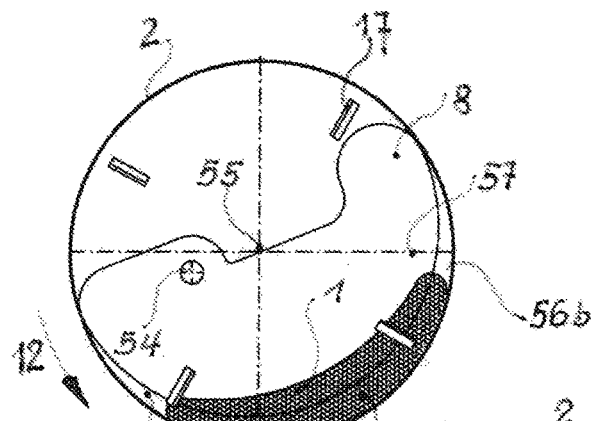
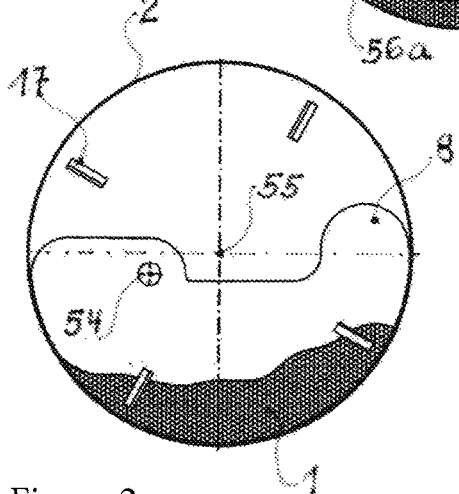
Figure 2a
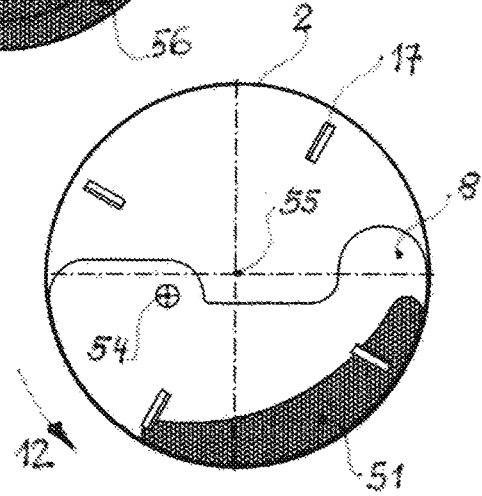
Figure 2b

MODULE FOR A COATING APPARATUS FOR GRANULAR BODIES

BACKGROUND OF THE INVENTION

The invention relates to a module for a coating apparatus for granular bodies, preferably tablets or pills.

It is possible by means of drum coaters to apply a functional layer in the form of a film layer to pressed tablet cores. This functional layer generally consists of water-soluble monomers in which removal of water and polyreaction are followed by chain formation to give homo- and copolymers. The task of this functional layer is to protect an active ingredient present in the tablet core from the action of light or oxygen, to prevent premature dissolution due to excessively high ambient humidity during storage, or to allow the active ingredient to show its effect only in particular zones of the digestive tract. Very high quality demands are therefore made on functional layers of this kind.

There are various embodiments of drum coaters for the coating to be carried out. They can essentially be divided into batch coaters and continuous drum coaters. While an application of functional layers by means of batch coaters no longer constitutes a technical challenge, there are still considerable problems in the case of continuous drum coaters in applying a functional layer with uniform thickness on the surface of the tablet. Document WO 2006/108280 A1 describes, for example, a continuous drum coater that achieves the very high demands on the layer thickness distribution as necessary, for example, for stomach-resistant film coatings only with a considerable degree of difficulty, if at all.

It is the case in conventional drum coaters that the latter are in each case available only in a single configuration, and there is no possibility of adapting them to different customer requirements. It is generally the case that a customer obtains a coating apparatus specially configured for the customer in accordance with the customers order. The respective coating apparatuses in this case are frequently one-offs, which increases the production costs and reduces the flexibility for an operator. With the known coating apparatuses, only an identical procedure for the formation of coatings is ever possible. Changed conditions during use cannot be taken into consideration.

SUMMARY OF THE INVENTION

The present invention is therefore based on the object of specifying possibilities for the coating, with which the flexibility can be increased both for an operator and for a manufacturer of coating apparatuses.

On a module according to the invention, there is a rotatable, hollow cylindrical drum as an accommodating unit for accommodating the granular bodies. In the drum, at least one moveable separating element is disposed on an end side of the drum, such that transfer of granular bodies into the drum and/or out of the drum is achievable in a defined manner by a movement of the at least one separating element that leads to release. The at least one separating element can be moved from a closed position, in which a closed subregion of an underside of the at least one separating element lies radially flush against an inner wall of the drum or is arranged at a distance from the inner wall of the drum with a gap measuring less than the external diameter of the granular bodies, into an open position of the at least one separating element, in which the subregion on the underside is spaced apart from the inner wall of the drum and, in this position of the separating element, there is an opening in the lower region between the underside of the respective separating element and the inner wall of the drum, through which the granular bodies can pass. The at least one separating element is moved here from a closed position into an open position by rotation of the at least one separating element about an axis of rotation $D_T$.

The at least one separating element is also designed so as to leave a clear space above the closed subregion.

On the end sides of the drum, there are stop elements, in particular flanges, with which a drum is connectable to at least one further module in order to form a coating apparatus, and/or to a closure element, in particular a coater door, which is pivotable about an axis, is connectable to the module. With flanges to be connected to each other, flange connections which can be connected releasably in particular by means of a screw connection can be produced when a coating apparatus having a plurality of interconnected modules which are preferably able to be configured differently taking into consideration the requirements of different users is intended to be provided.

With stop elements, a conventional screw or clamping connection can be formed or, in the case of coater doors, a hinge can be formed as the closure element. Seals can advantageously be accommodated in the end surfaces of the drum. Said seals can prevent tablets or else process air from passing in an uncontrolled manner to the outside.

The at least one separating element is advantageously rotatable with orthogonal alignment relative to the longitudinal axis in the drum and about a second axis of rotation arranged eccentrically in the drum and at a distance from the center of the circle defined by the radius of the curved form of the underside of the at least one separating element and aligned parallel to the axis of rotation or a longitudinal axis of the drum.

By means of the moveable separating element(s), the granular bodies in the form of a bulk material or batch can be treated in the drum of a module without any adverse mutual effect of the process steps that proceed in the different cycle zones with a module or a plurality of modules which are connected to one another. Moreover, the throughput can be increased since, as a result of the clock cycle, it is possible for different process steps to proceed simultaneously in parallel. This also creates the boundary conditions for a clocked flow production of granular bodies, which promote coating of uniform thickness. By virtue of the respective separating element being moveable into various positions, exchange of the granular bodies between the interconnected modules which in each case form a cycle zone can be effected easily and rapidly. By virtue of the opening being formed in the open position between the respective separating element and the inner wall, which is typically an inner wall of the drum, the granular bodies can additionally move without additional effort along this inner wall in the base region into the cycle zone, which is arranged downstream in the process direction, of a further module connected to the module, or to the outlet. With the aid of at least one radial paddle, which can be disposed in the interior of the drum of a module, it is possible to ensure permanent mixing of the granular bodies during the rotating of the drum. By virtue of the design of separating element with the eccentrically arranged axis of rotation of a separating element, it is possible to achieve reliable separation of modules, and accordingly of cycle zones formed therewith, without damage to granular bodies and without wear on the inner wall of the drum and on the underside of a separating element pointing in the direction of the inner wall of the drum. A gap may be present between the underside of a separating element and the inner wall in the closed position, of such a size that no granular bodies can pass through the gap and there is no occurrence of any direct contact of the underside of a separating element with the inner wall of the drum. The separating element may also be provided with a coating having a friction-reducing effect, or the entire separating element is composed of a friction-reducing material, for example from PTFE.

The transfer of granular bodies through at least one module, out of a module into a further module connected to said module, or out of a module can be achieved in a predominantly axial direction, preferably by opening at least one separating element, as the drum is rotating and the drum axis is inclined. By omission of the friction when the granular bodies are at rest, with the separating element open in each case, these tablets can pass from one module into a module which is arranged downstream and is connected to the module in which the separating element which is then open is arranged. As a result, boundary conditions can be met making it possible to be able to carry out continuously clocked production with the known advantages of a continuously operated process.

Modules can be produced individually in each case by themselves and then the individual modules can be mechanically connected axially to one another. This has the advantage of lower manufacturing costs.

With separating elements which are in each case attached in the vicinity of an end side of a module and can be pivoted by a shaft about an axis of rotation, a blocking action between individual modules can be achieved, as a result of which an undesirable transfer of granular bodies out of a module can be avoided. Separating elements can be pivoted with a shaft which is arranged coaxially with respect to the longitudinal axis of the drum and is oriented parallel thereto. With the shaft fastened in a mount on a coater door housing and/or on a coater door arranged on an end side of a module, the respective separating element can be pivoted in a suitable manner for opening and closing. The installation and adjustment of the respective separating elements in the case of at least two modules to be connected to one another can thus be considerably facilitated.

A perforation in the drum wall makes it possible to ensure supply of air and removal of air, for example in the case of heating, cooling or drying of the granular bodies or coatings applied thereto. For this purpose, the perforation may have round apertures, but rectangular, elliptical or differently shaped apertures are of course also possible.

The device for supplying or removing granular bodies may be a loading stub or a chute, while the outlet may take the form of an emptying chute. The spray apparatus may take the form of a nozzle arm and may be arranged in a module.

Through a perforated inner wall of the drum, even at low rates of rotation during rotation of the drum, a kidney-shaped bed of the granular bodies arises. The kidney-shaped bed is formed in the lower drum half and either in the lower, left or right subsection depending on the direction of rotation thereof.

Typically, the at least one separating element is arranged orthogonally to the axis of rotation or longitudinal axis of the drum. In this way, the respective separating element can be moved into the open position without any great hindrance by the granular bodies and in particular without hitting the radial paddle or the radial paddles.

By means of a second axis of rotation which is eccentric, i.e. spaced apart from the axis of rotation as the center of the rotational movement and about which the separating element(s) can be rotated, the respective separating element can be transferred reliably to the open position even during rotation of the drum.

The axis of rotation of the at least one separating element or in the case of presence of a plurality of separating elements should be arranged at a distance from the drum longitudinal axis in the opposite direction in relation to the direction of rotation of the drum alongside and preferably below the axis of rotation of the drum. It is thus possible to prevent granular bodies from being trapped between the underside of the respective separating element and the inner wall of the drum. This is because the rotational movement of the drum results in formation of a wedge-shaped field formed by the granular bodies moved by the rotation, which has a greater height level at the inner wall of the drum in the bed formed in the direction of rotation of the drum than in the middle of the drum.

A tilting apparatus can advantageously be disposed on the drum, by means of which the drum can be tilted at various angles, such that, under the action of gravity, on implementation of a tilt and with the drum rotating, the granular bodies can be transferred from one module to the other. This tilt is generally implemented in the direction of the outlet. Preferably, the tilting apparatus is disposed beneath the drum of at least one module and has a pivot bearing and at least one hydraulic cylinder as tilt drive. By simple tilting of the drum, the granular bodies can thus be moved in a simple manner between the modules which form various cycle zones and are connected to one another, and are removed from the drum or the coating apparatus. Typically, for tilting, the end of the drum at which the outlet is disposed is lowered. Alternatively, however, it is also possible to raise an end of the drum at which the supply of granular bodies, preferably with a coater door, is disposed.

Two mounts can be disposed on the drum of a module, by means of which the drum is rotatable by means of a drive motor. The mounts ensure reliable rotation of the drum.

In a preferred manner, there are at least three cycle zones provided by means of three interconnected modules. With at least two separating elements it is possible to form four cycle zones in the drums of the interconnected modules, namely the spray section, a measurement section, a further spray section as the second cycle zone designed for spraying, and the outlet stop. In the module arranged first in the process direction, the first spray apparatus with a spray arm should be fitted. In the module arranged downstream, there should be disposed a measurement module for determining the layer thickness of the coating on surfaces of granular bodies. This may preferably be a measurement apparatus for conducting optical coherence tomography. In a further module arranged downstream in the process direction, a further spray apparatus can be disposed as a cycle zone. In this way, correctly coated granular bodies can be dried, cooled and removed. A plurality of interconnected modules and the division achievable therewith into a plurality of cycle zones allows the coating to be carried out with finer adjustment. The second coating and intermediate measurement increases the accuracy of the application of the coating, since the layer thickness of the coating applied first is already known before the second coating. It is thus possible to minimize the overall error as a deviation between target layer thickness and the layer thickness actually applied. Since the measurement module may be arranged in a dedicated module in the form of a measurement and drying cycle zone, optical components of the measurement module are not exposed to spray mist. Typically, a greater layer thickness is applied in the first coating in a module with a spray apparatus than during the coating in a module arranged downstream in the process direction. Preferably, a distribution of the layer thicknesses between the first coating and the second coating is provided to be two thirds to one third. However, a distribution of the layer thicknesses in the modules may also be three quarters to one quarter. Typically, after the intermediate measurement, the respective spray rate for the second coating is calculated by an electronic evaluation and control unit.

Of course, it is also possible to select a different arrangement of interconnected modules which form a coating apparatus. The sequence of differently configured modules forming cycle zones and/or the number of the interconnected modules of a coating apparatus may vary.

An introduction section may also be formed, which is separated by a fourth separating element from the module, which is arranged first in the process direction, with a spray apparatus, and in which or on which the supply for granular bodies is arranged or projects into the module or into the plurality of interconnected modules, wherein, in this case, only one spray apparatus is disposed in this module as a cycle zone. By means of a separate introduction section, it is possible for granular bodies present in said module first of all to be dried and preheated, in order to remove any residual moisture still present and to coat the granular bodies only thereafter in said module as a correspondingly designed cycle zone.

Modules in the form of cycle zones with a spray apparatus are typically designed such that drying of the coated granular bodies still proceeds with the drum rotating before or after the spraying, in order to prevent individual granular bodies from sticking to one another.

There are preferably no radial paddles disposed in the module in which there is a measurement module within the corresponding drum, and therefore a monotonously flowing bed of the granular bodies arises here, which affords advantages with regard to the measurement of the layer thickness. However, radial paddles may also be arranged in all of the drums of modules.

For the situation involving the measurement of layer thicknesses <75 µm with a high degree of measurement accuracy, optical coherence tomography is preferred. However, the measurement method requires that the achieving of the maximum measurement resolution is achieved only with the monotonously flowing bed mentioned, and this can ultimately only arise when the mixer paddles are absent, since, with an increasing movement of the granular bodies, said movement also being uncontrollable irrespective of direction, the resolution capability decreases.

The optimum separation of method-induced mixing, coating and measurement in one process sequence can be an important advantage of the invention over the customary process sequences in batch coaters when a plurality of modified modules that are interconnected are jointly operated.

In addition, it is possible for a support bar running parallel to the longitudinal axis to be disposed as a guide bar in a drum or at a fixed location in the drum of a module and on which the spray apparatus, which is typically designed with a nozzle arm with spray nozzles mounted thereon, or the spray apparatuses and, if present, a measurement module is or are arranged so as to be moveable. By means of the moveable arrangement, it is possible to rapidly adjust the components mentioned to changed conditions in the interior of the respective drum.

It can also be provided that an accommodation frame disposed outside a drum of a module is connectable to the support bar in a pivotable manner, such that the accommodation frame, with the accommodation unit open, lies flush against the support bar, and the spray apparatus or the spray apparatuses and/or the measurement module is/are moveable out of the interior of the drum onto the accommodation frame outside the drum of a correspondingly designed module. By means of the movement out of the interior onto the accommodation frame disposed outside the respective drum, the spray apparatuses and the measurement module can be maintained or exchanged if the connection of modules which up to now have been connected to one another has been released in advance.

The drum of a module can have a coater door housing on both end sides, to which a support bar is secured, and on which a coater door and a mount for a shaft connected to the at least one separating element can be arranged.

During the coating of granular bodies, preferably tablets or pills, use can advantageously be made of a coating apparatus which is used with a plurality of modules connected to one another on their end sides and configured differently, as already explained by way of example. The coating apparatus should therefore be designed for carrying out the method which is described in more detail below.

In the method, the granular bodies which are to be coated can be introduced through an introduction means into the hollow cylindrical drum of a first module. Further modules are connected to said module in process directions, in each case at their end sides, and are connected to the module on which the introduction means for granular bodies into the coating apparatus is present. The drums of the modules are set in rotation and, with the drums rotating, the granular bodies are coated in the cycle zone which is arranged first in the process direction and is designed as a module with a spray apparatus. In said module, a separating element is disposed within the drum on the end side which is connected to a module which is arranged downstream in the process direction and, during the coating of the granular bodies, is in the closed position and remains in said position during the coating. In the closed position, a closed subregion of the underside of the at least one separating element lies radially flush against the inner wall of the drum, and a clear space remains between the module arranged first and a module arranged subsequently thereto in the process direction, or an outlet of the coating apparatus above the closed subregion.

In a module in the form of a cycle zone with a spray apparatus or a module arranged subsequently thereto in the process direction and in which there is preferably no measurement module as a cycle zone, the granular bodies can be dried with the drum rotating. The inlet for granular bodies, modules which form cycle zones and an outlet for ready-coated granular bodies can be separated from one another by at least one separating element in each case. If further additional cycle zones are formed with modules, they may likewise be separated from one another by at least one separating element in each case.

After a movement of the respective separating element into the open position, in which the subregion on the underside is spaced apart from the inner wall of the respective drum and an opening between a module in the form of a cycle zone and a module arranged downstream in the form of another cycle zone or the outlet has been opened up in the lower region between the underside of the respective separating element and the inner wall of the drum, the granular bodies can be moved into the module arranged downstream in each case or removed from the coating apparatus from the outlet. For transportation of the granular bodies, the drum(s) may be moved about a tilt axis orthogonal to the axis of rotation by means of a tilt arranged on the drum(s).

Alternatively or additionally, for transportation of the granular bodies out of the coating apparatus or for transportation of the granular bodies between the modules with the various cycle zones, in particular between a module with a spray apparatus, a module without a spray apparatus, or the outlet, the at least one separating element can be moveable parallel to the axis of rotation of the respective drum. For transportation of the granular bodies, the respective closed separating element in the respective drum is moved in the direction of the outlet from the drum to such an extent that the granular bodies are removed from the coating apparatus through an outlet of the respective drum and/or granular bodies are moved from a module with a spray apparatus into a module arranged downstream or to the outlet. Subsequently, the respective separating element is moved to the open position, in which the subregion is spaced apart from the inner wall of the respective drum on the underside of the separating element and there is an opening in the lower region between the underside of the separating element and the inner wall of the drum. The respective separating element is then moved back to an original position, where it is moved into the closed position. In this way, the granular bodies can be shifted within the respective drum in a simple manner by the separating element.

In the method described, in at least one of the cycle zones, which is formed by a module, at least one radial paddle should be disposed on the inner wall of the drum and/or at at least one side of at least one separating element, by means of which the granular bodies are mixed on rotation of the drum. The radial paddle(s) make(s) it possible to carry out uniform coating of the granular bodies in the drum, since the granular bodies pass at uniform time intervals through a center of a spray mist generated by the spray apparatus and, in the process, align their surface sections alternately to the spray jet of the spray apparatus. This is achieved by the radial paddle(s), in that constant mixing of the granular bodies is achieved with alternating alignment of the surface sections to the spray apparatus. From the filling to the emptying, the granular bodies move in constant flow on a base of the inner wall of drums.

The at least one separating element may be aligned orthogonally to the longitudinal axis in the drum of a module and, for opening, may be moved by a linear movement orthogonally to the longitudinal axis of the drum or preferably rotated about a second axis of rotation arranged eccentrically in the drum and at a distance from the center of the circle defined by the radius of the curved form of the underside of the at least one separating element and aligned parallel to the axis of rotation of the drum.

The movement of the granular bodies from one module into a module arranged downstream can be achieved by appropriate tilting of the drum and corresponding movement of the separating elements by rotation about an axis of rotation. In each case, a separating element arranged alongside another end of a module can be turned into an open position, while the other separating element remains in its closed position, in which its underside is in contact with the inner wall of the drum.

The invention will be explained in more detail using an exemplary embodiment of a coating apparatus having three modules which are arranged in a row and are interconnected.

The number of modules required depends upon the extent to which the product-dependent process steps can be combined in one section. For instance, in one module, for example in the case of high-value coatings, the intensive mixing of the granular bodies (tablet cores), for the purpose of homogenous distribution of the coating on the surfaces of the granular bodies, cannot be combined with the inline measurement of the coating thickness up to a resolution of <1 μm. What is important is not only more cost-effective continuous production, but it is also possible to use the possible advantages of the invention for an improvement in quality.

BRIEF DESCRIPTION OF THE DRAWINGS

The invention will be explained in more detail by way of example with the aid of drawings, according to FIGS. 1 and 2. In the drawings:

FIG. 2 shows a sectional illustration through a drum on one of the separating elements, wherein then FIG. 2a shows a closed separating element which lies with an end surface against the inner wall of a drum, and the granular bodies (tablet cores) are located in the lower part when the drum is not rotating, and FIG. 2b shows the drum rotating in the counter clockwise direction and, in the process, forming a kidney-shaped bed formed with granular bodies (tablet cores). The direction of rotation is dependent on the position of the shaft 54 which, in this example, is located on the left of the central axis of the drum 2, and FIG. 2c shows the drum according to FIG. 2b rotating and the separating element executes an analogous pivoting movement in the same direction during the opening. This permits the transfer of granular bodies past the separating element into a neighboring section or a module arranged alongside. The wedge-shaped opening produced on both sides by rotation of the separating element covers, when open, the resulting cross section of the bed formed with granular bodies.

DETAILED DESCRIPTION

Figure 1:
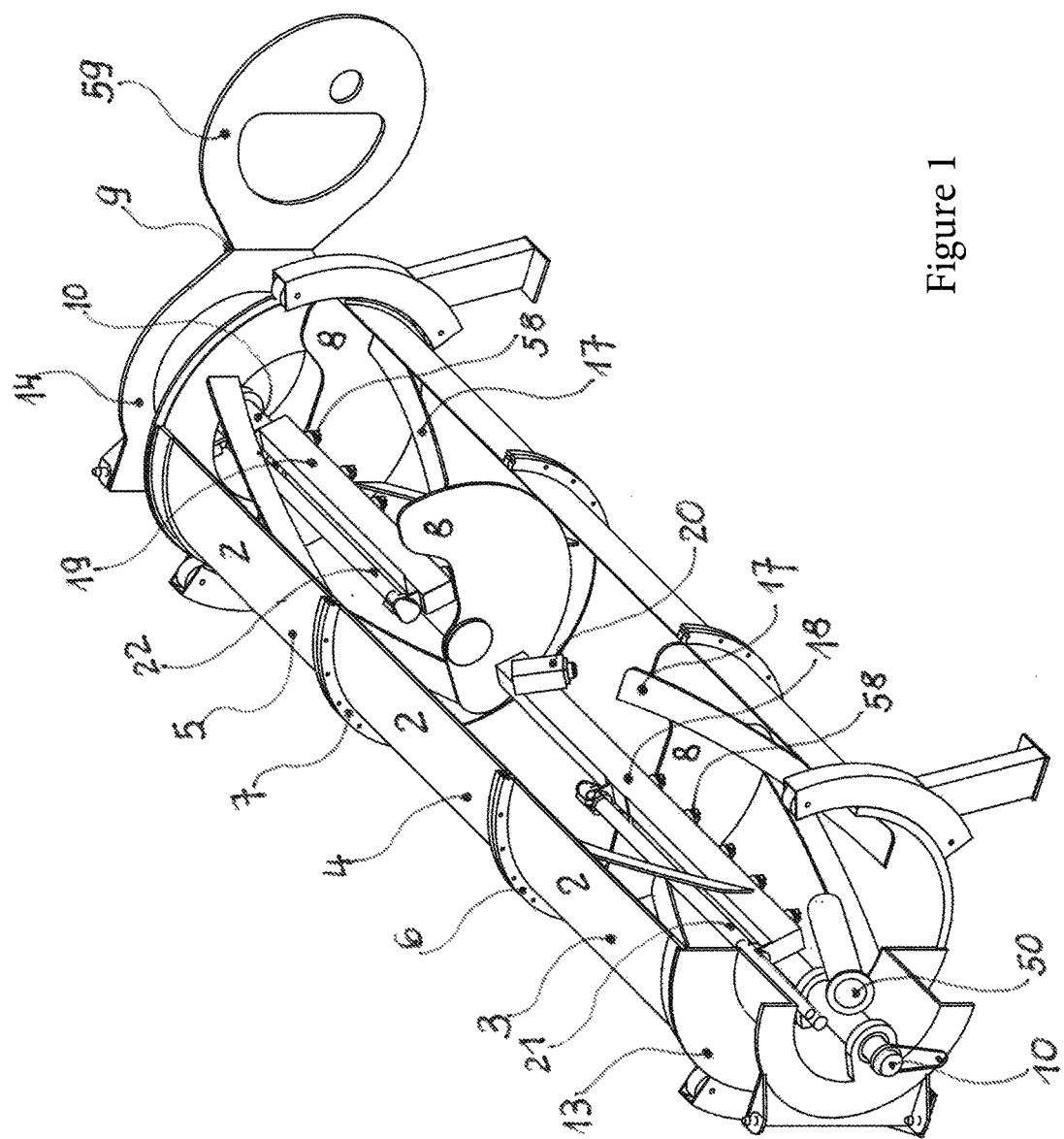
FIG. 1 shows a perspective illustration of an example of a coating apparatus for three granular bodies, which is formed by three interconnected examples of modules according to the invention. Structural elements for supplying and removing process air, in the form of what are referred to as air supply shoes and waste air shoes, are positioned on the outer casing of the drums and covering of the coating apparatus with what is referred to as a wet cell which serves for accommodating the flushing water during the washing of drums together with the internals thereof and partially assists the conduction of air in the coating apparatus, and also the apparatus for tilting the coating apparatus for the purpose of transferring granular bodies, on which apparatus the mount for the rotatable drum is also located, is not illustrated.

FIG. 1 shows an example of a coating apparatus for granular bodies 1, which is formed by three interconnected modules 3, 4, 5. Each of the modules has a hollow cylindrical drum 2 and at least one separating element 8 which is arranged in the region of an end side of the respective module 3, 4 or 5 and is pivotable about the axis of rotation of a shaft 10, and therefore annular bodies 1 can be transferred into the drum 2 of a respective module 3, 4 or 5 and/or out of the respective drum 2 in a defined manner by means of movement of the at least one separating element 8 that leads to release.

The respective separating element 8 is movable from a closed position, in which a closed subregion of an underside of the at least one separating element 8 lies radially flush against an inner wall of the drum 2 or is arranged at a distance from the inner wall of the drum 2 with a gap measuring less than the external diameter of the granular bodies.

The modules 3 and 4 and also the modules 4 and 5 are releasably connected to one another via flange connections 6 and 7. For this purpose, a respective flange can be formed on the end sides of the modules 3, 4 and 5, which flange can be used, for connection of the respective modules 3 with 4 and 4 with 5, for example by means of screw connections. There are advantageously sealing elements in the end sides of flanges.

In the example shown of a coating apparatus, the modules 3 and 5 are each provided with a nozzle arm 18 and 19 which is introduced into the drums 2 and is arranged here above a recessed region of the separating elements 8. The two nozzle arms 18 and 19, on which the spray nozzles 58 and the associated support bars 21 and 22 are located, are constructed in such a manner that, by being connected to the support bars 21 and 22 in a hanging and moveable manner, they can be moved or positioned in the interior of the drums 2 without colliding with the separating elements 8. The support bars 21 and 22 projecting into the interior of the drums 2 are fastened to the respective coater door housings 13 and 14.

The module 4 in which the layer thickness achieved on the granular bodies 1 is measured is located between the modules 3 and 5. The module 4 differs from the modules 3 and 5 in that it does not have any mixing paddles for circulating the granular bodies 1 during the coating, and therefore a monotonously flowing bed 51 arises, permitting the high measurement resolution of the measurement device. Before the measurement, the granular bodies 1 are carefully dried so that an approximately real layer arises during the later use. For measurements of high accuracy within the 50 µm range with a resolution of =<1 µm, optical coherence tomography is generally used. The sensor module 20 is located on or in a coater door housing on at least one of the two nozzle arms 18 or 19. It is the nozzle arm 18 in the case illustrated. That is to say, when the nozzle arm 18 is retracted, not only are the spray nozzles 58 for the module 3 positioned, but the sensor module 20 is also brought into the measurement position for measuring the layer thickness in the module 4. Since >⅔ of the layer thickness has already been applied in the module 3, and the real thickness achieved for said layer thickness has been measured with high accuracy in the module 4, it is possible to achieve improved accuracy of the end layer thickness in comparison to other technical solutions, after further coating in the module 5. This is because the error during the subsequent coating will be small because of the optimally adjusted and relatively low spray rate.

As appears to be easy to understand, the uncoated granular bodies 1 first of all pass into the module 3 of the coating apparatus. This can be achieved via the filling stub 50. In this case, the separating element 8, which is arranged shortly before the flange connection 6 in the module 3, is in its closed position, and therefore transfer of granular bodies 1 into the central module 4 can be prevented when the loading and coating are taking place in the module 3.

For example, after expiry of a predefinable time and/or spraying with a predefined spray rate from the spray nozzles 58 which are present and pre-drying of the granular bodies 1, granular bodies 1 which are partially coated on their surfaces can be transferred into the central module 4 by the separating element 8, which is arranged in the region of the end side of the module 3 toward the central module 4, being pivoted in such a manner that, in an open position of said separating element 8, the subregion on the underside is spaced apart from the inner wall of the drum 2 in the module 3 and, in this position of said separating element 8, there is an opening in the lower region between the underside of the respective separating element 8 and the inner wall of the drum 2, through which the granular bodies 1 can pass into the module 4 when the drum 2 is rotating and the drum longitudinal axis 55 is tilted. The separating element 8 which is arranged in the central module 4 on the side facing the module 5 is in a closed position here. As already stated, the measurement of the layer thickness previously achieved in the module 3 takes place in the central module 4 in accordance with the abovementioned explanation.

After the layer thickness has been determined, the separating element 8 which is arranged in the module 4 can be pivoted into an open position, and therefore granular bodies 1 pass through the gap with a wedge-shaped opening 56 between the underside of said separating element 8 and the drum inner wall into the module 5 as the drum rotates and the drum longitudinal axis 55 is tilted, in which module the surfaces of the granular bodies 1 are completely coated.

After expiry of the cycle time and appropriate drying, the separating element 8 which is arranged in the transverse direction of the granular bodies 1 at the end of the module 5 is pivoted into its open position, and therefore the ready-coated granular bodies 1 pass out of the coating apparatus outward analogous to the above-depicted transfer.

That is to say, the transfer of the granular bodies 1 from one module into a module arranged downstream, i.e. from module 3 into module 4, from module 4 into module 5 and from module 5 out of the coating apparatus, is triggered by tilting of the central drum longitudinal axis 55 with simultaneous rotation of the interconnected drums 2 of modules 3, 4 and 5. In this case, the module 3 is arranged vertically higher than the end side of the module 5 at its end in the transfer direction of the granular bodies 1. This can be achieved by means of a tilting drive (not shown).

The outwardly pointing end sides of the modules 3 and 5 are sealed axially with the coater door housings 13 and 14 and the doors thereof, of which only coater door 59 is illustrated, can be closed when a coating is carried out within the coating apparatus. For this purpose, the coater door housings 13 and 14 are fastened pivotably to the coater door housings 13 and 14 by means of hinges 9.

The coater door housings 13 and 14 can be used for guiding and fixing the nozzle arms 18 and 19 with their support bars 21 and 22. The shafts 10 which are used for pivoting the separating elements 8 are also mounted on the inner sides of the coater door housings 13 and 14.

Within the drum 2, radial paddles 17 are present in the modules 3 and 5, with the aid of which the granular bodies 1 can be moved within the respectively formed bed 51 in such a manner that the surfaces thereof can be uniformly coated.

Each of the modules 3 to 5 forms a cycle zone, as has been explained in the general part of the description.

The coating apparatus shown in FIG. 1 is merely one example. The coating apparatus may, of course, also be formed by two or else more than three interconnected modules 3 to 5, which are shown in FIG. 1. Adaptation to the respective requirements of a user can therefore be achieved in a simple manner. The modular construction enables the costs and the outlay for the production to be reduced and flexible adaptation to customer requirements to be achieved.

FIG. 2 shows orthogonal sections to the drum longitudinal axis 55 using an example of a module according to the invention.

FIG. 2a shows the granular bodies 1 in the lower zone of the drum 2, for example after the loading of the module 3. The separating element 8 is closed and, according to FIG. 2a, separates the modules from one another. In the closed state, all of the separating elements 8 can be slightly spaced with their undersides from the drum inner wall by a maximum of 2 mm.

Subsequently, the drum 2 rotates about its longitudinal axis in a counterclockwise direction, illustrated by the arrow 12. The granular bodies 1 then form the striking kidney-shaped bed 51 according to FIG. 2b, predominantly with the aid of the perforation in the drum wall 2. The four radial paddles 17 attached to the drum inner wall of the modules 3 and 4 turn the bed 51 over permanently and mix the granular bodies 1. This effect is an important prerequisite for the later formation of a homogenous layer thickness distribution on the surfaces of the granular bodies 1 of the application of coatings, especially of film layers.

FIG. 2b shows how, during rotation of the drum 2 of a module, a kidney-shaped bed 51 of granular bodies 1 forms during rotation of the drum 2 counterclockwise, and the separating element 8 has remained in the closed position.

FIG. 2c illustrates the separating element 8 in an open position. The latter has been achieved by pivoting the separating element 8 about the axis of rotation 54. The axis of rotation 54 which is predetermined by the shaft 10 for rotating the separating element 8 is arranged eccentrically and at a distance from the central longitudinal axis or axis of rotation 55 of the drum 2. Between the underside of the separating element 8 and the drum inner wall, a gap having a wedge-shaped opening 56 is formed during the opening, through which granular bodies 1 can pass and, for example, can be guided into another, further module downstream, which is connected to the module shown, or can be guided out of one of the a plurality of interconnected modules by means of a removal means.

Granular bodies 1 located in the vicinity of the lower end of the wedge-shaped opening 56a are drawn right away from the lower end of the wedge piece 56a of the opening 56 by rotation of the perforated drum 2. The upper end of the wedge piece 56b of the opening 56 is arranged above the height line 57, and therefore the bed 51 does not reach said region 56b during rotation of the drum 2. The height line 57 may be arranged horizontally in the plane in which the axis of rotation 55 or the central longitudinal axis of the drum 2 is arranged.

What is claimed is:

1. A module for a coating apparatus for granular bodies (1), the module comprising:
    a rotatable, hollow cylindrical drum (2) that is an accommodation unit for accommodating the granular bodies (1),
    wherein within the drum (2) at least one moveable separating element (8) is disposed on an end side of the drum (2) such that transfer of the granular bodies (1) into the drum (2) and/or out of the drum (2) is achievable in a defined manner by a movement of the at least one moveable separating element (8);
    wherein the at least one moveable separating element (8) is movable from a closed position to an open position, wherein, in the closed position, a closed subregion of an underside of the at least one moveable separating element (8) lies radially flush against an inner wall of the drum (2) or is arranged radially offset at a distance from the inner wall of the drum (2) via a gap measuring less than an external diameter of each of the granular bodies (1), and in the open position, the closed subregion on the underside is spaced apart from the inner wall of the drum (2) and, in this said open position of the at least one moveable separating element (8), there is an opening in the lower region between the underside of the respective at least one moveable separating element (8) and the inner wall of the drum (2), through which said opening the granular bodies (1) are arranged to pass, and
    wherein the at least one moveable separating element (8) is configured to rotate about an axis of rotation (54) to bring the at least one moveable separating element (8) from the closed position into the open position, and the at least one moveable separating element (8) is configured so as to leave a clear space above the closed subregion, and on the end sides of the drum (2) there are elements (6, 7) to which a second drum (2) of at least one second module (3, 5) is connectable in order to form the coating apparatus, and/or to which a closure element (59) is connectable.

2. The module as claimed in claim 1, characterized in that the at least one moveable separating element (8) is rotatable with orthogonal alignment relative to a longitudinal axis (55) in the drum (2) about the axis of rotation (54) arranged eccentrically in the drum (2) and at a distance from the center of the circle defined by the radius of the curved shape of the underside of the at least one moveable separating element (8) and aligned parallel to the axis of rotation (54) or the longitudinal axis (55) of the drum (2).

3. The module as claimed in claim 1, characterized in that the axis of rotation (54) of the at least one moveable separating element (8) is arranged at a distance from a longitudinal axis (55) of the drum in an opposite direction in relation to a direction of rotation (12) of the drum (2) and alongside the axis of rotation (54) or the longitudinal axis (55) of the drum (2).

4. The module as claimed in claim 1, characterized in that two support bars (21, 22) which are oriented parallel to a longitudinal axis (55) of the drum (2) can be disposed in the drum (2) and can be secured to at least one coater door housing (13, 14) on which the nozzle arms (18, 19) with spray nozzles and/or a sensor module (20) for determining the layer thickness of a coating applied to surfaces of granular bodies (1) is/are arranged so as to be moveable.

5. A system comprising: a first module (4) for a coating apparatus for granular bodies (1), the first module (4) comprising:
    a rotatable, hollow cylindrical drum (2) that is an accommodation unit for accommodating the granular bodies (1),
    wherein within the drum (2) at least one moveable separating element (8) is disposed on an end side of the drum (2) such that transfer of the granular bodies (1) into the drum (2) and/or out of the drum (2) is achievable in a defined manner by a movement of the at least one moveable separating element (8);
    wherein the at least one moveable separating element (8) is movable from a closed position to an open position, wherein, in the closed position, a closed subregion of an underside of the at least one moveable separating element (8) lies radially flush against an inner wall of the drum (2) or is arranged radially offset at a distance from the inner wall of the drum (2) via a gap measuring less than an external diameter of each of the granular bodies (1), and in the open position, the closed subregion on the underside is spaced apart from the inner wall of the drum (2) and, in this said open position of the at least one moveable separating element (8), there is an opening in the lower region between the underside of the respective at least one moveable separating element (8) and the inner wall of the drum (2), through which said opening the granular bodies (1) are arranged to pass, and wherein the at least one moveable separating element (8) is configured to rotate about an axis of rotation (54) to bring the at least one moveable separating element (8) from the closed position into the open position, and the at least one moveable separating element (8) is configured so as to leave a clear space above the closed subregion, and on the end sides of the drum (2) there are elements (6, 7) to which a second drum (2) of at least one second module (3, 5) is connectable in order to form the coating apparatus, and/or to which a closure element (59) is connectable, wherein the at least one second module (3, 5) is coupled to the first module (4), wherein the first module (4) or the at least one second module (3, 5) defines a cycle zone (I, II, III), wherein a spray arm (18, 19) for forming the coatings on surfaces of the granular bodies (1) is disposed in the cycle zone (I, II, III).

6. The system as claimed in claim 5, characterized in that a sensor module (20) for optical determination of the layer thickness is disposed in the first module (4), and said first module (4) is disposed following the at least one second module (3, 5) in which the spray arm (18, 19) disposed, and the first module (4) and the at least one second module (3, 5) are connected to each other and form the coating apparatus.

7. The system as claimed in claim 5, characterized in that the first module (4) having therein a sensor module (20) is disposed between two of the at least one second modules (3, 5) in which a spray apparatus with the spray arm (18, 19) is in each case disposed, and the first module (4) and the two of the at least one second modules (3, 5) are connected to one another and form the coating apparatus.

8. The module as claimed in claim 1, characterized in that a device (50) for supplying the granular bodies (1) is disposed on a coater door (13, 14), which is fastened to an end side of the drum (2) of the at least one second module (3, 5), said device (50) being in the form of a chute.

9. The module as claimed in claim 1, characterized in that a tilting or pivoting apparatus is disposed on the drum (2), by means of which the drum (2) can be tilted at various angles, such that, under the action of gravity, on implementation of a tilt, granular bodies (1) are movable out of the module when the at least one moveable separating element (8) is open, wherein the tilting or pivoting apparatus is disposed beneath the drum (2) and has a pivot bearing with at least one drive for the tilting or pivoting.

10. The module as claimed in claim 1, wherein the elements (6, 7) are flange connections.

11. The module as claimed in claim 1, wherein the axis of rotation (54) of the at least one moveable separating element (8) is offset from a longitudinal axis of rotation (55) of the drum (2).

* * * * *